United States Patent [19]
Hackman

[11] 3,977,532
[45] Aug. 31, 1976

[54] TRAIN COUPLING SYSTEM

[75] Inventor: Kenneth V. Hackman, Monrovia, Calif.

[73] Assignee: Southwest Products Co., Monrovia, Calif.

[22] Filed: July 28, 1975

[21] Appl. No.: 599,693

[52] U.S. Cl. .................................. 213/208; 280/494
[51] Int. Cl.² ........................................... B61G 1/00
[58] Field of Search ............. 213/208, 209, 210, 79, 213/75, 112; 280/493, 494; 403/287, 77, 79, 56, 44, 184, 182

[56] References Cited
UNITED STATES PATENTS 486,375    11/1892    Grund ................................ 213/208
1,574,746    3/1926    Anthes ............................. 403/77 X

FOREIGN PATENTS OR APPLICATIONS 897,858    5/1962    United Kingdom ................. 213/112

Primary Examiner—Stanley H. Tollberg
Assistant Examiner—John P. Shannon
Attorney, Agent, or Firm—Lyon & Lyon

[57] ABSTRACT

A train coupling system includes a turnbuckle shaft having opposite ends threaded into rod end bearings. Each of such bearings includes a ball secured in a clevis and each such clevis in turn, is pivotally mounted in a clevis on a corresponding train car such that there is automatic alignment when and as the train cars travel on the road bed.

2 Claims, 2 Drawing Figures

TRAIN COUPLING SYSTEM

The present invention relates to a coupling system which is particularly useful in coupling railroad cars.

An object of the present invention is to provide an improved coupling system which provides automatic alignment when and as the coupled vehicles are in motion.

Another object of the present invention is to provide an improved train coupling system using self-aligning rod end type bearings and in which coupling and decoupling of trains may be accomplished with relative ease.

Another object of the present invention is to provide a coupling system using a combination of self-aligning rod end bearings as part of a turnbuckle assembly.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
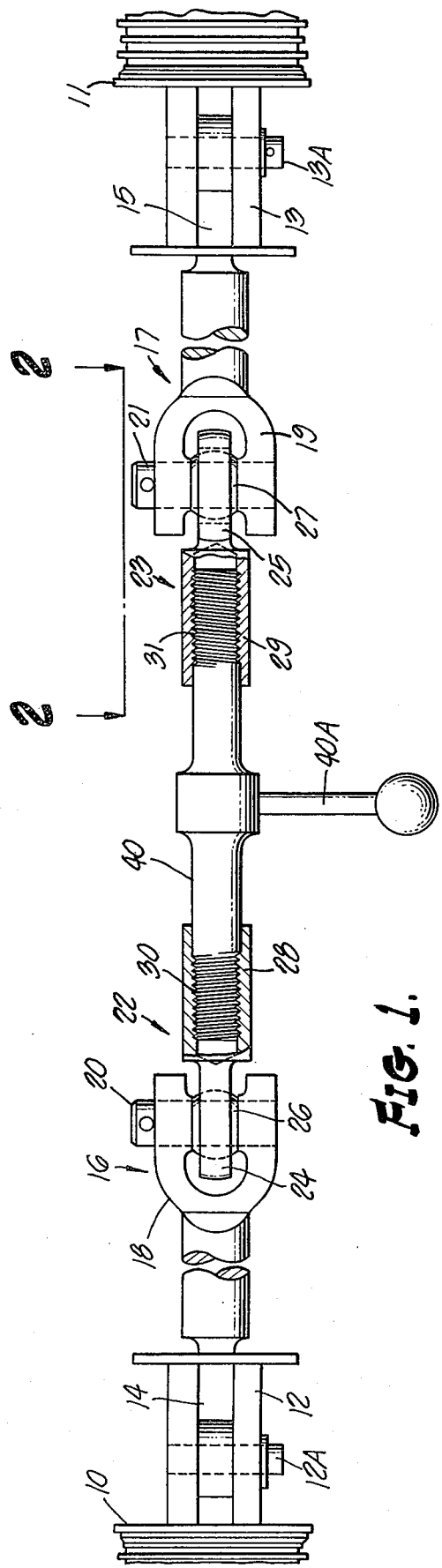
FIG. 1 is a top plan view of a coupling system embodying features of the present invention.
Figure 2:
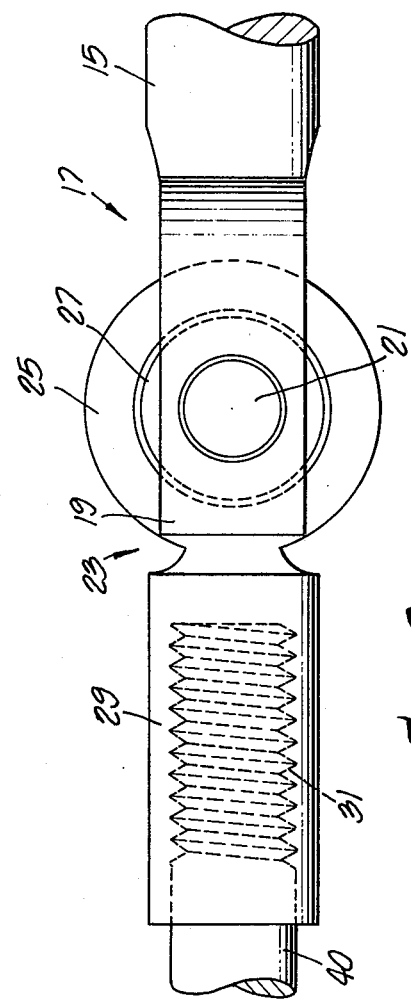
FIG. 2 is a view taken substantially as indicated by the lines 2—2 in FIG. 1.

The two vehicles coupled are railroad cars, portions of which are illustrated at 10 and 11 with clevises 12 and 13 respectively mounted on the same.

These clevises 12 and 13 have a special type of tongue member 14 and 15 pivotally maintained therein by clevis pins 12A and 13A which extend generally horizontal to provide pivotal movement of the tongue members about a horizontal axis.

These tongue members 14, 15 are each part of a corresponding ball joint assembly 16 and 17 and more specifically an extension of another clevis 18, 19 respectively. Mounted within each clevis 18, 19 by a corresponding pin 20, 21 is a so called rod end 22, 23. Each such rod end 22, 23 includes an outer race member 24, 25 within which there is a captivated ball 26, 27, each ball 26, 27 being apertured to snugly receive the corresponding clevis pin 20, 21.

Each race member 24, 25 is free to move on the corresponding ball 26, 27 for alignment purposes and has an integrally formed shank 28, 29, such shanks 28, 29 being internally threaded at 30, 31 with threads of opposite hand to provide part of a turnbuckle, the other part of such turnbuckle being a rod 40 threaded into shanks 28, 29 with a lever arm 40A secured to the same so as to facilitate turning of rod 40 for coupling and decoupling in train coupling and decoupling operations.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. A coupling arrangement for coupling two vehicles including a pair of self-aligning rod end bearings, each of said bearings including a race member and a spherical ball element moveably mounted in said race member, first means connecting the ball element of one of said pair of bearings to one of said vehicles, second means connecting the ball element of the other one of said pair of bearings to the other one of said vehicles, and third means interconnecting the race members of said pair of bearings, said first means including a first clevis connected to said ball element, said first clevis having a shank portion, and means pivotally mounting said shank portion about an axis and on said one vehicle.

2. An arrangement as set forth in claim 1 in which said ball element of one of said rod end bearings has a pin securing said ball to said first clevis, and said pin has its axis extending substantially parallel to axis.

* * * * *